United States Patent [19]

Hwang

[11] Patent Number: 5,117,684
[45] Date of Patent: Jun. 2, 1992

[54] AIR PRESSURE MEASURING PEN

[76] Inventor: Raymond Hwang, No. 35, Sec 4, Ting Tsao Rd., Lu Kang, Chang Huah, Taiwan

[21] Appl. No.: 533,438

[22] Filed: Jun. 5, 1990

[51] Int. Cl.$^5$ .......................... B60C 23/02; G01L 7/16
[52] U.S. Cl. ....................................... 73/146.8; 73/714; 73/744; 116/34 R
[58] Field of Search ..................... 73/146.8, 146.3, 744, 73/714; 116/34 R

[56] References Cited

U.S. PATENT DOCUMENTS 4,501,142  2/1985  Huang ........................... 73/146.8
4,768,460  9/1988  Soon-Fu ........................ 73/744
4,966,035  10/1990 Huang ........................... 73/744

Primary Examiner—Donald O. Woodiel
Attorney, Agent, or Firm—Fleit, Jacobson, Cohn, Price, Holman & Stern

[57] ABSTRACT

An air pressure measuring pen of a neat and satisfactory design is provided. The pen includes a transparent hollow pen tube having a top end and a bottom end, a clipping cover connected to the top end and having an exhaust valve, a check valve and a measuring head, a spring urging in the pen tube apart a stopping medium and a piston in the pen tube, an ink holder, and an ink holder positioner connected to the bottom end.

6 Claims, 4 Drawing Sheets

AIR PRESSURE MEASURING PEN

BACKGROUND OF THE INVENTION

The present invention relates to a pen, and more particularly to an air pressure measuring pen.

The conventional air pressure measuring pen, as shown in FIG. 1, includes a pen tube 1, a measuring head 2 mounted on tube 1, a piston 3 received in tube 1 also receiving therein a sealing piece 4, a spring 5 mounted bwtween piston 3 and piece 4, an indicating rod 6 capable of protruding out of tube 1 and having an outer scale 7 and an ink holder 8 therein, and a threaded fixture 9 respectively fixing rod 6 and holder 8 in tube 1 and rod 1. In use, head 2 is inserted upon an air valve of a tire, the pressurized air in the tire will protrude, through piston 3, sealing piece 4 and spring 5, rod 6 out of tube 1 to show the air pressure in the tire.

Such air pressure measuring pen must have the tube 1 large enough to receive therein rod 6 requiring to be troublesomely provided with an inner long hole to receive therein ink holder 8. In order to measure the air pressure and to write with the present pen, fixture 9 must first be unscrewed from tube 1. In addition, when rod 6 is protruded out of tube 1 by the tire air pressure, rod 6 easily gets inadvertently retracted into tube 1 to force the user to measure the air pressure anew.

SUMMARY OF THE INVENTION

It is therefore an object of the present invention to provide an air pressure measuring pen having a pen tube having a reduced diameter.

It is further an object of the present invention to provide an air pressure measuring pen having a neat design.

It is additional an object of the present invention to provide an air pressure measuring pen capable of optionally keeping measured air pressure.

According to the present invention, an air pressure measuring pen includes a hollow pen tube having a top end and a bottom end, an ink holder, an ink holder positioner connected to the bottom end and a clipping cover connected to the top end, in which the measuring pen further has a stopping medium received in the bottom end, a piston received in the pen tube, a spring urging apart the medium and the piston, and a check valve received in the clipping cover and cooperating with the piston to form therebetween an air chamber; the clipping cover includes an exhausting valve capable of communicating with the air chamber, a measuring head at a top thereof, an actuating protrusion mounted in the measuring head, an air passage provided around the protrusion and communicable with the air chamber so that when the head is inserted upon an air valve of a tire an air in the tire will pass through the passage into the air chamber; and the pen tube is transparent and includes a lower vent and an outer pressure scale.

The present invention may best be understood through the following description with reference to the accompanying drawings, in which:

DETAILED DESCRIPTION OF THE PREFERRED EMBODIMENT

Figure 1:
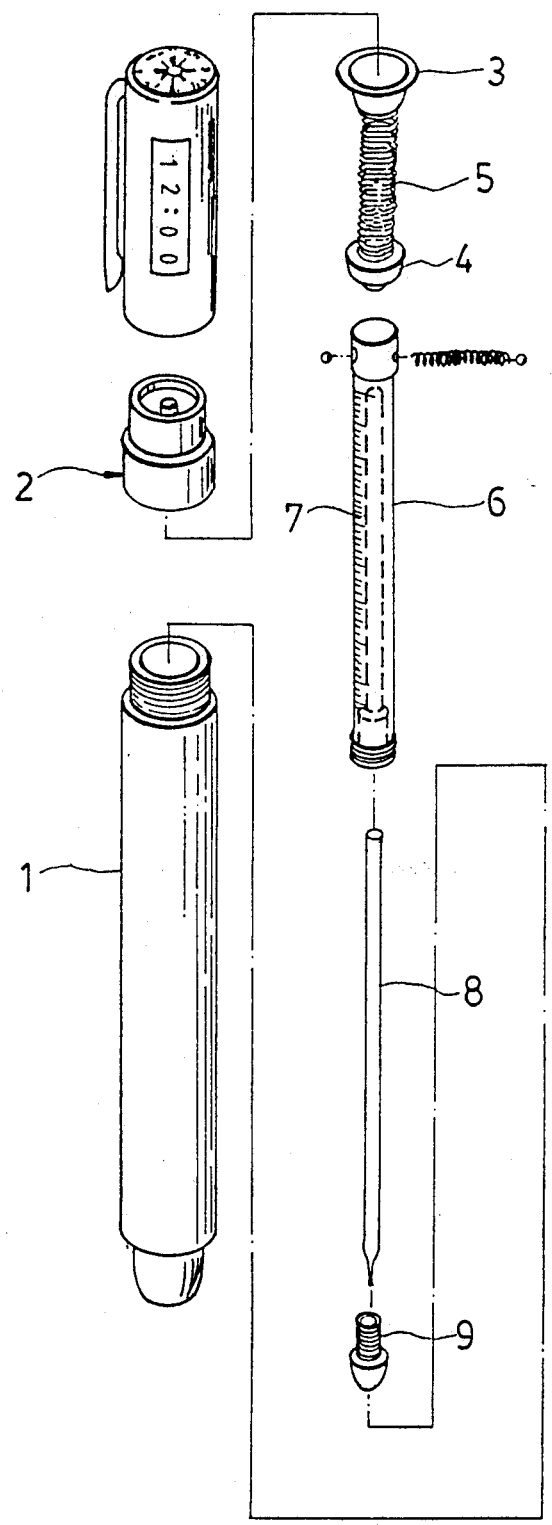
FIG. 1 is an exploded view of a prior air pressure measuring pen.
Figure 2:
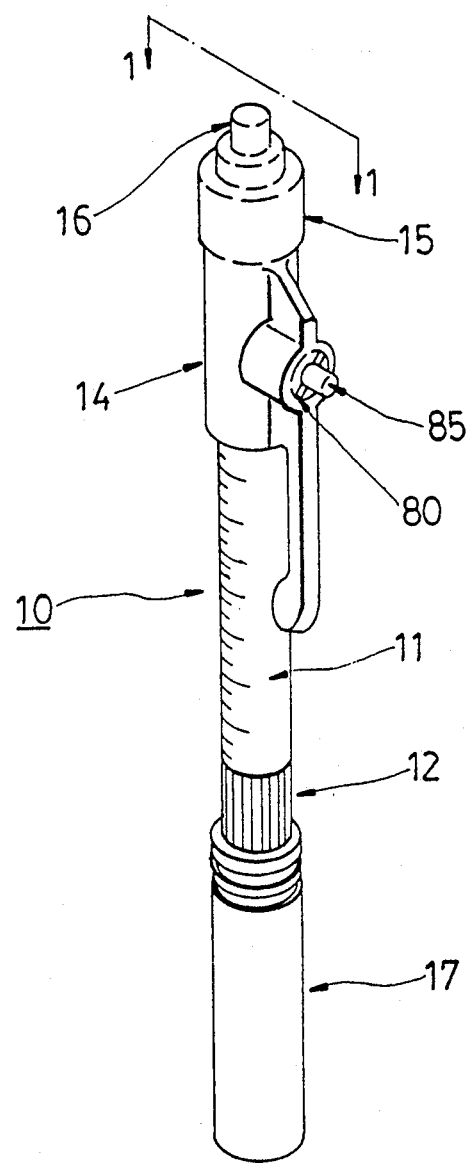
FIG. 2 is a perspective view showing a preferred embodiment of an air pressure measuring pen according to the present invention.
Figure 3:
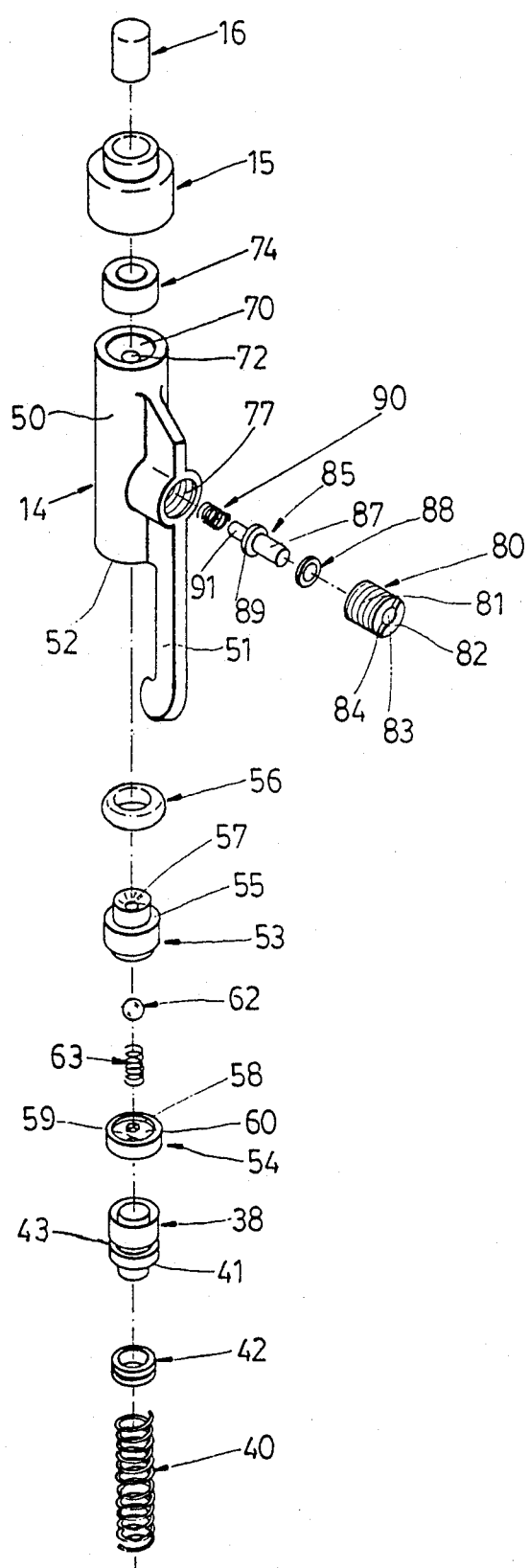
FIG. 3 is an exploded view of a measuring pen in FIG. 2.
Figure 3:
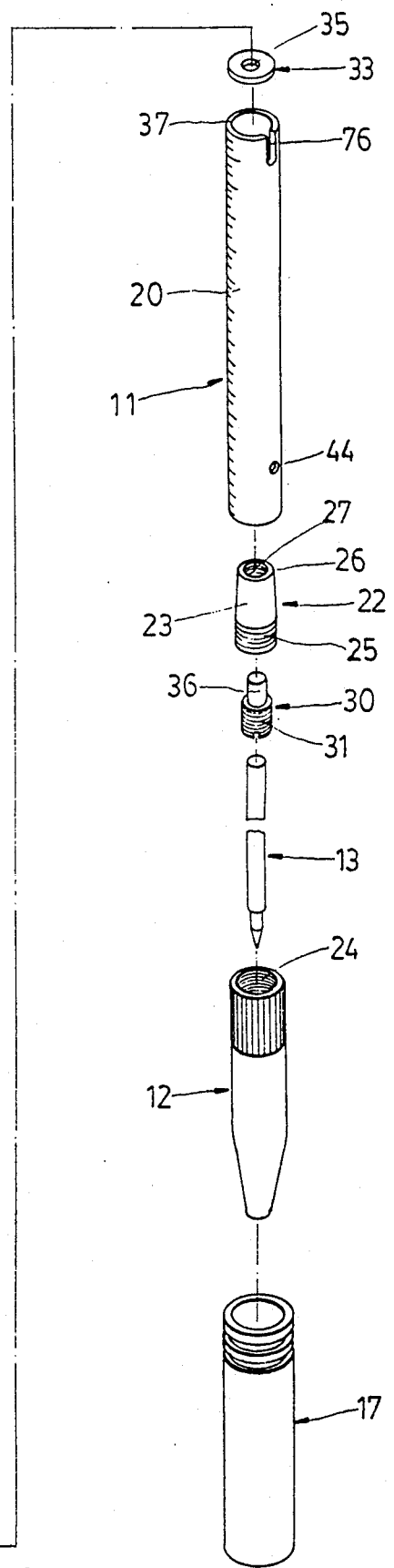
Figure 4:
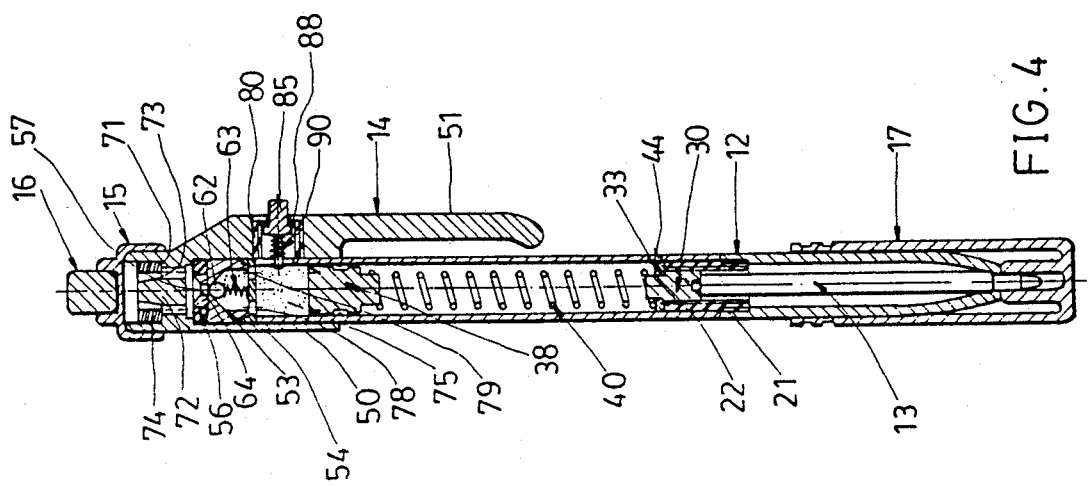
FIG. 4 is a sectional view taken along line 1—1 in FIG. 2.
Figure 5:
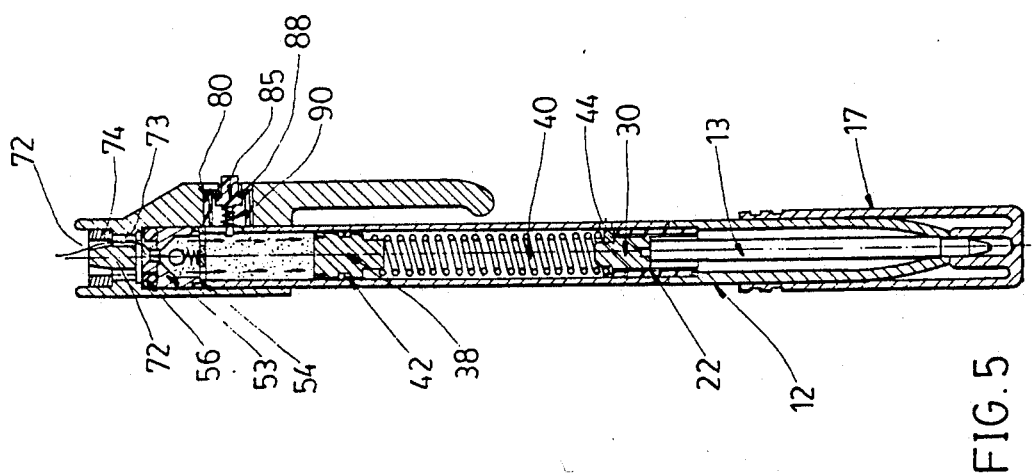
FIG. 5 is further a sectional view taken along line 1—1 in FIG. 2.

Referring now to FIGS. 2-5, an air pressure measuring pen 10 according to the present invention includes a hollow pen tube 11, an ink holder positioner 12 connected to the bottom end of tube 11 and receiving therein an ink holder 13, a clipping cover 14 connected to the top end of tube 11, a top cover 15 covering on cover 14 and fixing thereon an eraser 16, and a bottom cover 17 covering on positioner 12.

Pen tube 11 is transparent and includes an outer scale 20 and a lower downwardly enlarging tapered inner portion 21. A hollow connector 22 is received in pen tube 11 and includes a tapered part 23 matching with tapered portion 21, a male screw thread 25 engaging with a female screw thread 24 in postioner 12, and a female screw thread 26 in its top wall 27. A stopping medium includes a plug 30 having a lower male screw thread 31 engaging with female thread 26, and a stopper 33 placed on a shoulder formed by tapered portion 21 and having a through hole 35 protruding therethrough an upper protrusion 36 of plug 30. Pen tube 11 further receives therein a piston 38 and a spring 40 mounted between stopper 33 and piston 38 which further includes a lower shoulder 41 and an annular groove 43 sleeving therein an indicating ring 42 preferably having a red outer surface. Tube 11 also has a lower vent 44 so that the air between stopper 33 and piston 38 can be freely discharged therefrom.

Clipping cover 14 includes a clipping medium 51 and a clipping body 50 which further includes a receiving room 52, and receives therein a check valve seat 53 and a circular baffle 54 having two through holes 58, 59 and a recess 60. Seat 53 includes an upper shoulder 55 mounting thereon a sealing ring 56, an axial hole 57 having a tubular portion 64, and a lower end matched in recess 60. Seat 53 and baffle 54 mount therebetween a ball 62 and a spring 63 urging ball 62 against tubular portion 64. Body 50 further includes a measuring head 70, an inner shoulder 71, an actuating protrusion 72, an air passage 73 provided around protrusion 72, and an annular pad 74 mounted on shoulder 71.

Piston 38 and baffle 54 form therebetween an air chamber 75. Body 50 includes a threaded mounting hole 77 threadedly engaging thereto a male thread 81 of an exhausting valve seat 80 having a through hole 83 and an end surface 82 having a radial through groove 84. A valve body 85 of the exhausting valve is generally mounted in seat 80 and includes a diametrally relatively larger portion 87 sleeving thereon an annular washer 88 and capable of protruding out of through hole 83, an intermediate annular flange 89, and a diametrally relatively smaller portion 91 sleeving thereon a spring 90 mounted between flange 89 and the tube top end having a groove 76 so that spring 90 always urges washer 88 to seal through hole 83 and when large portion 87 is inwardly pushed, the air in chamber 75 will pass through groove 76 and hole 83 to be discharged. If seat 80 needs to be position-adjusted, a tool capable of engaging in groove 84 can be used.

In use, top cover 15 is first removed and measuring head 70 is inserted upon a tire air valve a pressurized air passing through air passage 73, axial hole 57 and holes 58, 59 into air chamber 75 to downwardly urge piston 38 and spring 40 to a balanced extent so that indicating ring 42 will show the tire air pressure on scale 20. After measuring head 70 is removed from the tire air valve, spring 63 and ball 62 will block up hole 57 so that piston 38 and ring 42 will keep positioned in the displaced position. If the measured air pressure is no more needed, larger portion 87 is inwardly pushed to discharge the air in chamber 75 out of through hole 83 so that spring 40 will return piston 38 into the non-actuated position and a new measurement can be taken place.

What I claim is:

1. An air pressure measuring pen comprising a transparent hollow pen tube having a top end and a bottom end, an ink holder positioner connected to said bottom end, a clipping cover connected to said top end, characterized in that:

said air pressure measuring pen further includes:
a stopping medium received in said bottom end;
a piston received in said pen tube;
a spring urging said piston apart from said medium;
a check valve in said clipping cover; and cooperating with said piston to form therebetween an air chamber;
said clipping cover includes an exhausting valve capable of communicating with said air chamber, a measuring head at a top thereof, an actuating protrusion mounted in said measuring head, and an air passage provided around said protrusion and communicable with said air chamber through said check valve so that when said head is inserted upon an air valve of a tire, air in said tire will pass through said passage and check valve into said air chamber thereby depressing said piston toward said stopping medium by compression of the spring; and
said pen tube includes a lower vent and an outer pressure scale to cooperate with the piston and provide an indication of tire pressure dependent on the amount of compression of the spring.

2. An air pressure measuring pen according to claim 1 wherein said pen tube includes a lower downwardly enlarging tapered inner portion forming a top shoulder, and a hollow connector having a tapered part matching with said tapered portion and a male screw thread engaging with a female screw thread on said positioner.

3. An air pressure measuring pen according to claim 2 wherein said stopping medium includes a stopper positioned on said shoulder and having a through hole, and a plug position—adjustably inserted in said hollow connector.

4. An air pressure measuring pen according to claim 1, further comprising an indicating ring sleeved on said piston.

5. An air pressure measuring pen according to claim 1 wherein said check valve includes:
a circular baffle having through holes;
a check valve seat received in said clipping cover, mounted on said circular baffle and having a valve passage;
a ball received in said valve seat; and
a spring mounted between said circular baffle and said check valve seat for urging said ball against said valve passage.

6. An air pressure measuring pen according to claim 1 wherein:
said clipping cover includes a mounting hole;
said top end has a groove: and
said exhausting valve includes:
a valve seat having a through hole and position—adjustably mounted in said mounting hole;
a valve body mounted in said valve seat and having a diametrally relatively larger portion capable of protruding out of said through hole, an intermediate annular flange and a diametrally relatively smaller portion;
a spring sleeved on said smaller portion and mounted between said top end and said annular flange; and
an annular washer sleeved on said larger portion and mounted between said annular flange and said valve seat.

* * * * *